US012602793B2

(12) United States Patent (10) Patent No.: US 12,602,793 B2
Bower, III et al. (45) Date of Patent: Apr. 14, 2026

(54) SYSTEMS AND METHODS FOR PREDICTING OBJECT LOCATION WITHIN IMAGES AND FOR ANALYZING THE IMAGES IN THE PREDICTED LOCATION FOR OBJECT TRACKING

(71) Applicant: Lenovo Enterprise Solutions (Singapore) Pte Ltd., Singapore (SG)

(72) Inventors: Fred Allison Bower, III, Morrisville, NC (US); Gary D. Cudak, Morrisville, NC (US); David W. Cosby, Morrisville, NC (US); Jian Li, Morrisville, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 454 days.

(21) Appl. No.: 17/855,522

(22) Filed: Jun. 30, 2022

(65) Prior Publication Data

US 2024/0005520 A1 Jan. 4, 2024

(51) Int. Cl.
*G06T 7/215* (2017.01)
*G06T 7/11* (2017.01)
*G06T 7/174* (2017.01)
*G06T 7/90* (2017.01)

(52) U.S. Cl.
CPC ................ *G06T 7/215* (2017.01); *G06T 7/11* (2017.01); *G06T 7/174* (2017.01); *G06T 7/90* (2017.01)

(58) Field of Classification Search
None
See application file for complete search history.

(56) References Cited

U.S. PATENT DOCUMENTS

| | | | | |
|---|---|---|---|---|
| 11,758,291 B2 * | 9/2023 | Robinson | ............ | G01N 29/069 73/622 |
| 11,760,280 B2 * | 9/2023 | Bradley | ................. | G01S 17/66 701/27 |
| 12,036,978 B2 * | 7/2024 | Aoki | ................ | B60W 30/0956 |

(Continued)

FOREIGN PATENT DOCUMENTS

JP 2017163510 A * 9/2017

OTHER PUBLICATIONS

Machine Translation: JP2017163510A (Year: 2017).*

(Continued)

*Primary Examiner* — Michelle M Entezari Hausmann
(74) *Attorney, Agent, or Firm* — Olive Law Group, PLLC

(57) ABSTRACT

Systems and methods for predicting object location within images and for analyzing the images in the predicted location for object tracking are disclosed. According to an aspect, a method includes receiving one or more first images captured by an image capture device. The method also includes determining a speed and/or a direction of movement of an object of interest based on the one or more first images. Further, the method includes receiving one or more second images captured by an image capture device. The method also includes predicting an area of location of the object of interest within the one or more second images (Continued)

RECEIVE ONE OR MORE FIRST IMAGES CAPTURED BY AN IMAGE CAPTURE DEVICE IN ACCORDANCE WITH A FIRST IMAGE SAMPLING CHARACTERISTIC
400

IDENTIFY AN OBJECT OF INTEREST AMONG THE FIRST IMAGE(S)
402

DETERMINE A SPEED AND/OR A DIRECTION OF MOVEMENT OF THE OBJECT OF INTEREST
404

INSTRUCT THE IMAGE CAPTURE DEVICE TO CAPTURE ONE OR MORE SECOND IMAGES AT A SECOND IMAGE SAMPLING CHARACTERISTIC THAT IS DIFFERENT THAN THE FIRST IMAGE SAMPLING CHARACTERISTIC BASED ON THE DETERMINE SPEED AND/OR DIRECTION OF MOVEMENT OF THE OBJECT OF INTEREST
406

ANALYZE THE SECOND IMAGE(S) FOR TRACKING THE OBJECT OF INTEREST
408 based on the determined speed and/or direction of movement of the object. Further, the method includes analyzing the one or more second images in the predicted area of location for tracking the object of interest.

12 Claims, 5 Drawing Sheets

(56) References Cited

U.S. PATENT DOCUMENTS

| | | | | |
|---|---|---|---|---|
| 2005/0232466 A1* | 10/2005 | Kampchen | ............. | G06T 7/251 |
| | | | | 382/104 |
| 2010/0209090 A1* | 8/2010 | Kludas | ................... | G01S 17/66 |
| | | | | 396/89 |
| 2012/0057049 A1* | 3/2012 | Imagawa | ................. | G06T 5/94 |
| | | | | 348/E9.053 |
| 2012/0229659 A1* | 9/2012 | Solomon | ............... | H04N 25/61 |
| | | | | 348/207.11 |
| 2015/0178568 A1* | 6/2015 | Shellshear | ............. | G06T 7/277 |
| | | | | 382/103 |
| 2016/0182866 A1* | 6/2016 | Landqvist | ............. | H04N 23/60 |
| | | | | 348/143 |
| 2017/0177937 A1 | 6/2017 | Harmsen et al. | | |
| 2017/0206426 A1* | 7/2017 | Schrier | ................. | G06V 10/82 |
| 2018/0336701 A1* | 11/2018 | Yokota | ................... | B60R 21/00 |
| 2019/0087959 A1* | 3/2019 | Kitamura | .......... | A61B 1/00045 |
| 2019/0356864 A1* | 11/2019 | Elhage | .................. | H04N 5/265 |
| 2020/0077019 A1* | 3/2020 | Kim | ...................... | H04N 23/951 |
| 2022/0006944 A1* | 1/2022 | Neser | ...................... | H04N 5/77 |
| 2022/0035067 A1* | 2/2022 | Mahapatra | ............ | G06V 20/52 |
| 2022/0130155 A1* | 4/2022 | Herbst | ...................... | G06T 7/20 |
| 2022/0180536 A1* | 6/2022 | Oami | ................... | G06V 20/52 |
| 2022/0329726 A1* | 10/2022 | Cho | ....................... | H04N 23/63 |
| 2022/0366572 A1* | 11/2022 | Ding | ....................... | G06T 7/246 |
| 2023/0134579 A1* | 5/2023 | Akimoto | ............... | G06V 10/25 |
| | | | | 348/148 |
| 2023/0196705 A1* | 6/2023 | Hu | ......................... | G06V 20/52 |
| | | | | 382/103 |
| 2023/0222667 A1* | 7/2023 | Abdollahian Noghabi | ................ | |
| | | | | G06V 20/13 |
| | | | | 382/155 |

OTHER PUBLICATIONS

Leon F, Gavrilescu M. A review of tracking and trajectory prediction methods for autonomous driving. Mathematics. Mar. 19, 2021;9(6):660. (Year: 2021).*

Leon F, Gavrilescu M. A review of tracking, prediction and decision making methods for autonomous driving. arXiv preprint arXiv: 1909.07707. Sep. 17, 2019. (Year: 2019).*

Fernando, Tharindu, et al. "Tracking by Prediction: A Deep Generative Model for Multi-Person Localisation and Tracking". 2018 IEEE Winter Conference on Applications of Computer Vision (WACV). 11 pages. (2018).

Seong, Seonkyeong, et al. "Determination of Vehicle Trajectory through Optimization of Vehicle Bounding Boxes using a Convolutional Neural Network". Sensors (Basel), vol. 19, No. 19. 30 pages. (Oct. 2019).

Pan, Jiyan, et al. "An Efficient Object Tracking Algorithm with Adaptive Prediction of Initial Searching Point". PSIVT 2006: Advances in Image and Video Technology, pp. 1113-1122 (2006).

Zhou, Dingfu, et al. "Moving object detection and segmentation in urban environments from a moving platform". Image and Vision Computing, vol. 68, pp. 76-87 (2017).

* cited by examiner

100

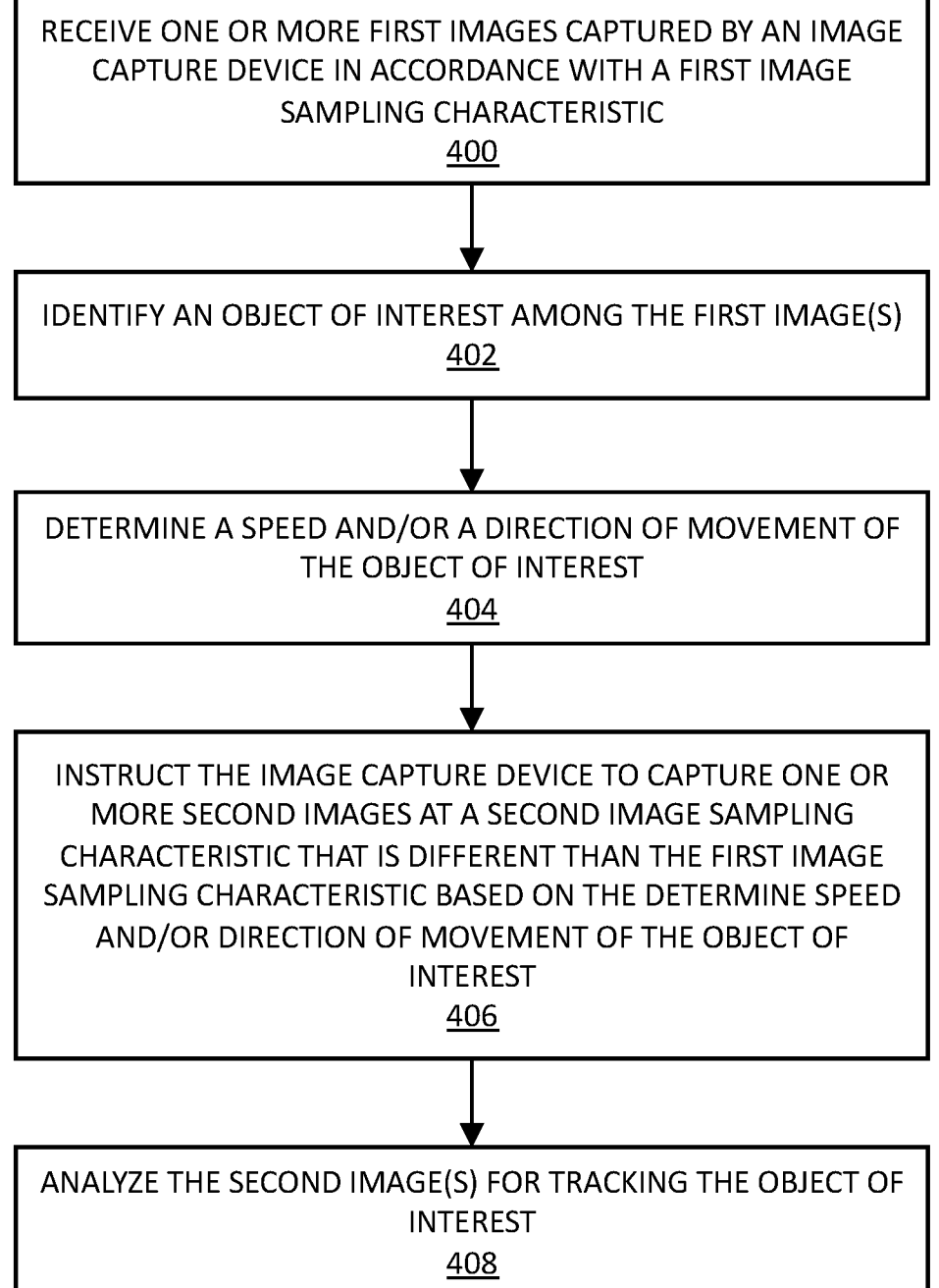

RECEIVE ONE OR MORE FIRST IMAGES CAPTURED BY AN IMAGE CAPTURE DEVICE IN ACCORDANCE WITH A FIRST IMAGE SAMPLING CHARACTERISTIC
400

IDENTIFY AN OBJECT OF INTEREST AMONG THE FIRST IMAGE(S)
402

DETERMINE A SPEED AND/OR A DIRECTION OF MOVEMENT OF THE OBJECT OF INTEREST
404

INSTRUCT THE IMAGE CAPTURE DEVICE TO CAPTURE ONE OR MORE SECOND IMAGES AT A SECOND IMAGE SAMPLING CHARACTERISTIC THAT IS DIFFERENT THAN THE FIRST IMAGE SAMPLING CHARACTERISTIC BASED ON THE DETERMINE SPEED AND/OR DIRECTION OF MOVEMENT OF THE OBJECT OF INTEREST
406

ANALYZE THE SECOND IMAGE(S) FOR TRACKING THE OBJECT OF INTEREST
408

FIG. 4

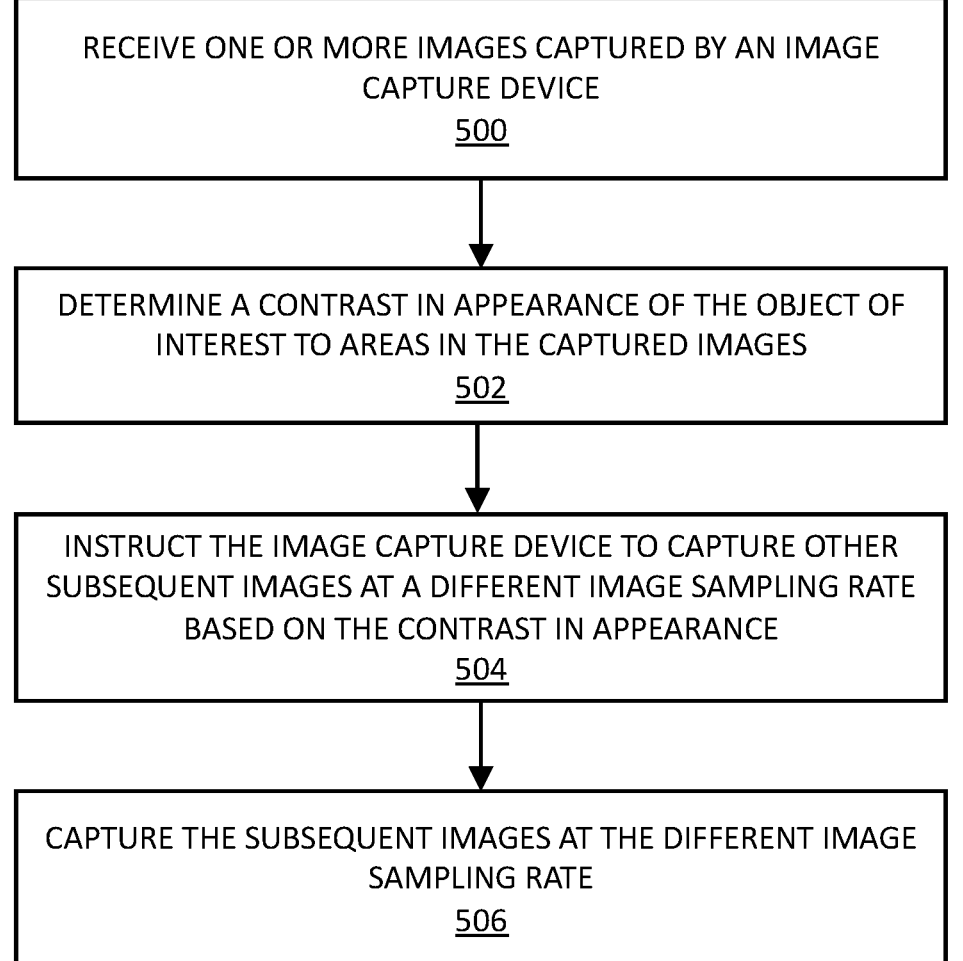

RECEIVE ONE OR MORE IMAGES CAPTURED BY AN IMAGE
CAPTURE DEVICE
500

DETERMINE A CONTRAST IN APPEARANCE OF THE OBJECT OF
INTEREST TO AREAS IN THE CAPTURED IMAGES
502

INSTRUCT THE IMAGE CAPTURE DEVICE TO CAPTURE OTHER
SUBSEQUENT IMAGES AT A DIFFERENT IMAGE SAMPLING RATE
BASED ON THE CONTRAST IN APPEARANCE
504

CAPTURE THE SUBSEQUENT IMAGES AT THE DIFFERENT IMAGE
SAMPLING RATE
506

FIG. 5

SYSTEMS AND METHODS FOR PREDICTING OBJECT LOCATION WITHIN IMAGES AND FOR ANALYZING THE IMAGES IN THE PREDICTED LOCATION FOR OBJECT TRACKING

TECHNICAL FIELD

The presently disclosed subject matter relates generally to image and video processing. Particularly, the presently disclosed subject matter relates to systems and methods for predicting object location within images and for analyzing the images in the predicted location for object tracking.

BACKGROUND

In many image or video processing applications, one or more objects are located, identified, and tracked. For example, it is often useful to track objects in the applications of security and surveillance, video communication and compression, augmented reality, traffic control, medical imaging, and video editing. Such tracking can be a time-consuming and difficult process, particularly in the cases of a large amount of video to process.

Objects are typically tracked by associating the object in consecutive video frames. This can be difficult when the object is fast moving relative to the video frame rate. In addition, it can be difficult to track an object when it changes orientation. Further, object identification to locate an object within a video stream is computationally expensive, and often require special purpose hardware for accelerated computation to keep pace with the video feed.

In view of the aforementioned difficulties, there is a need for improved systems and techniques for tracking objects in videos.

BRIEF DESCRIPTION OF THE DRAWINGS

Figure 1:
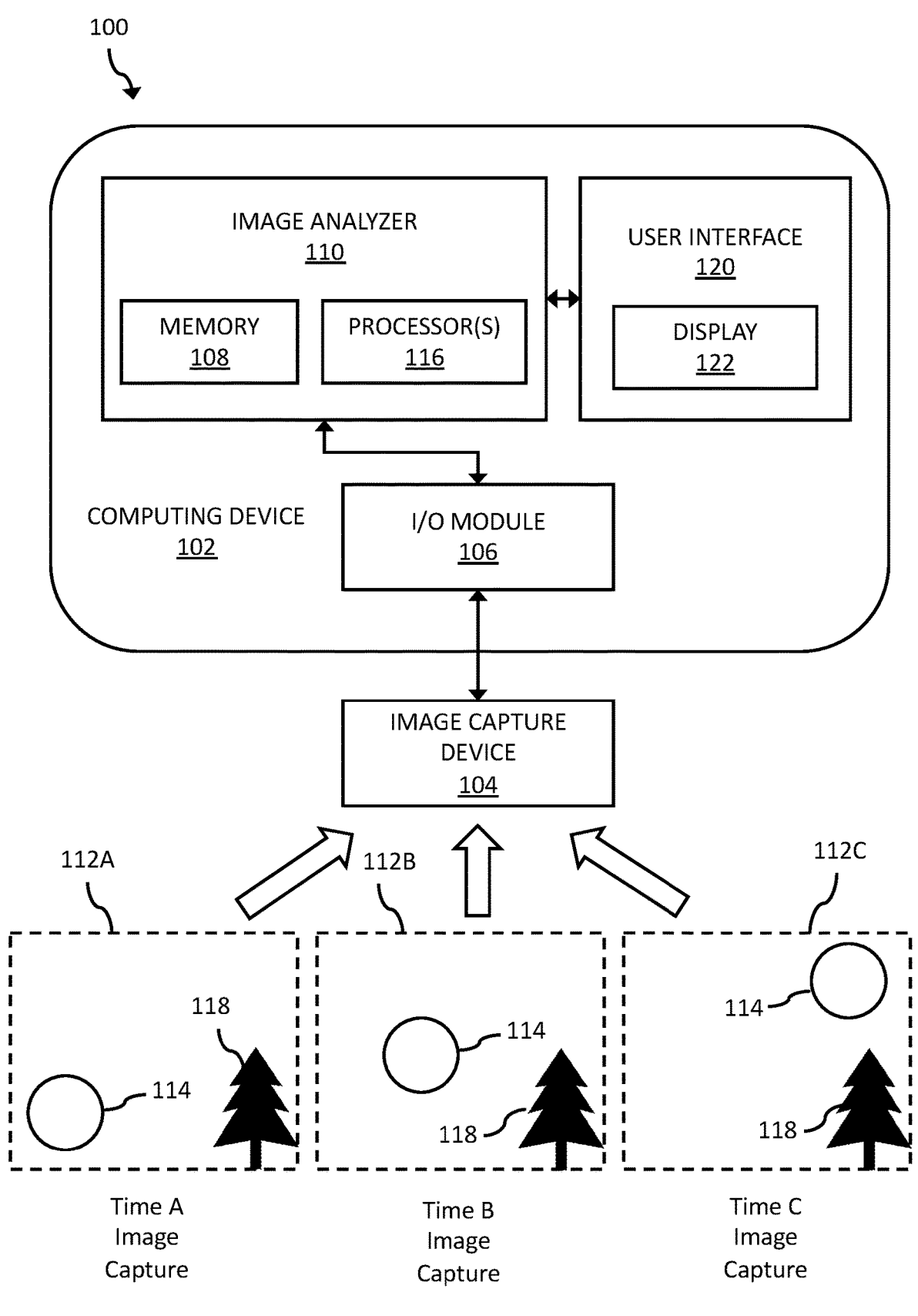
Figure 2:
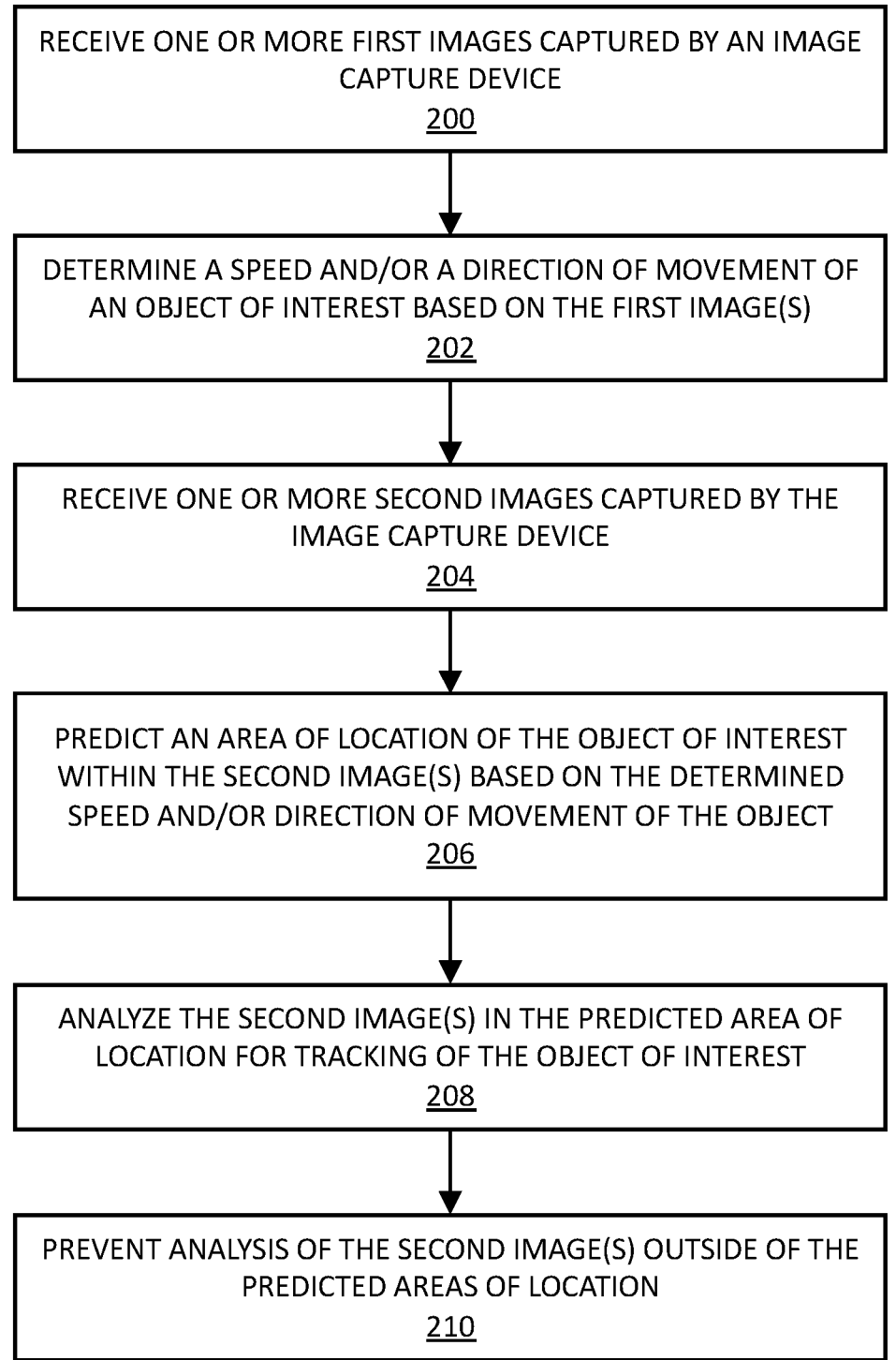
Figure 3:
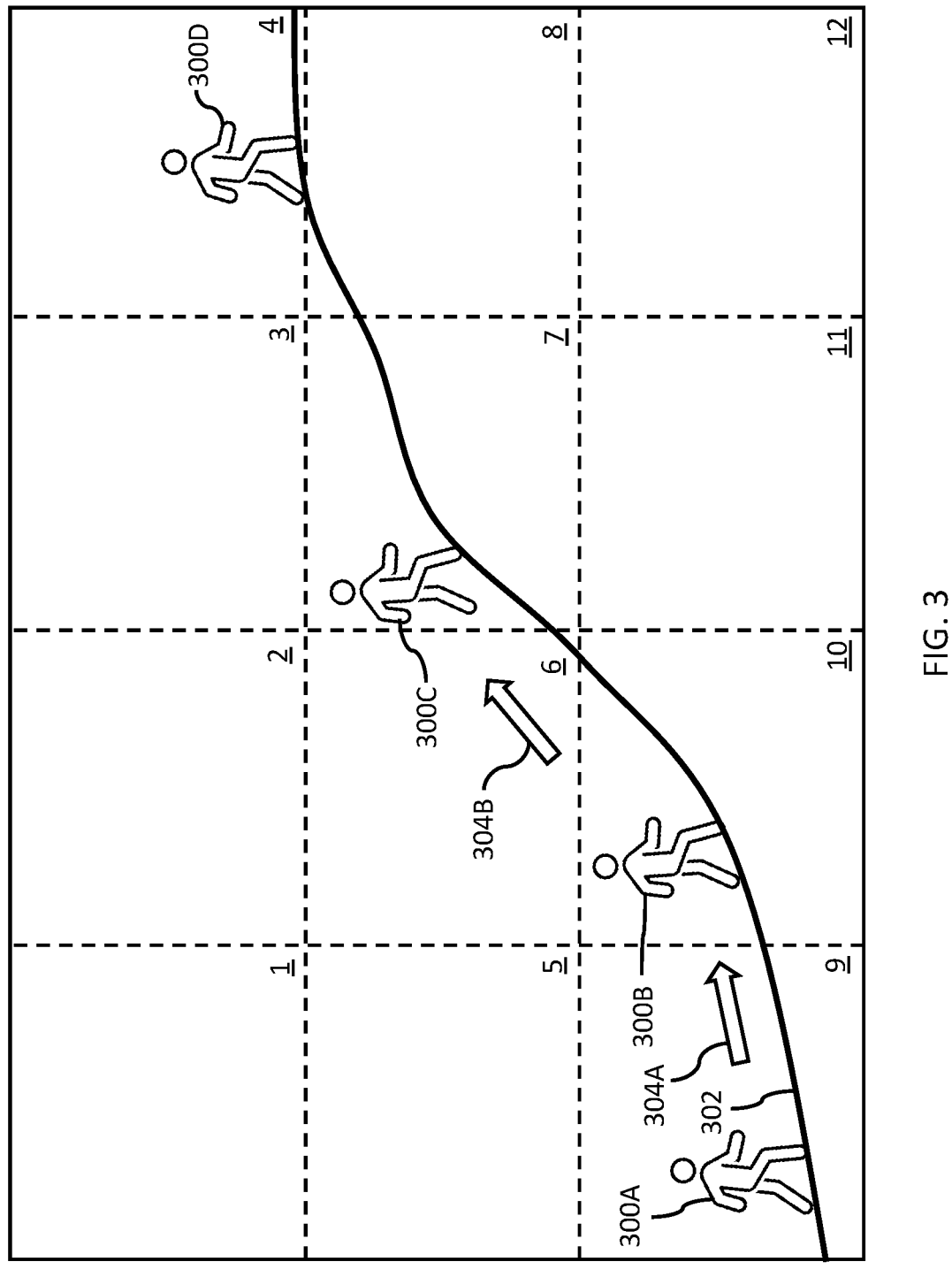

Having thus described the presently disclosed subject matter in general terms, reference will now be made to the accompanying Drawings, which are not necessarily drawn to scale, and wherein:

FIG. 1 is a block diagram of a system for predicting object location within images and for analyzing the images in the predicted location for object tracking according to embodiments of the present disclosure;

FIG. 2 is a flow diagram of a method for predicting object location within images and for analyzing the images in the predicted location for object tracking in accordance with embodiments of the present disclosure;

FIG. 3 is diagram depicting a sequence of images captured of an object of interest over time for showing how the object's location at a later captured image is predicted in accordance with embodiments of the present disclosure;

FIG. 4 is a flow diagram of a method for predicting object location within images and for analyzing the images in the predicted location for object tracking in accordance with embodiments of the present disclosure; and FIG. 5 is a flow diagram of a method for capturing images at a different image sampling rate based on color and/or structure of an object of interest as compared to other areas in images in accordance with embodiments of the present disclosure.

SUMMARY

The presently disclosed subject matter relates to systems and methods for predicting object location within images and for analyzing the images in the predicted location for object tracking. According to an aspect, a method includes receiving one or more first images captured by an image capture device. The method also includes determining a speed and/or a direction of movement of an object of interest based on the one or more first images. Further, the method includes receiving one or more second images captured by an image capture device. The method also includes predicting an area of location of the object of interest within the one or more second images based on the determined speed and/or direction of movement of the object. Further, the method includes analyzing the one or more second images in the predicted area of location for tracking the object of interest.

According to another aspect, a method includes receiving one or more first images captured by an image capture device in accordance with a first image sampling characteristic. The method also includes identifying an object of interest among the one or more first images. Further, the method includes determining a speed and/or a direction of movement of the object of interest. The method also includes instructing the image capture device to capture one or more second images at a second image sampling characteristic that is different than the first image sampling characteristic based on the determined speed and/or direction of movement of the object of interest. Further, the method includes analyzing the one or more second images for tracking the object of interest.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

FIG. 1 illustrates a block diagram of a system 100 for predicting object location within images and for analyzing the images in the predicted location for object tracking according to embodiments of the present disclosure. Referring to FIG. 1, the system 100 includes a computing device 102 and an image capture device 104 that are operatively connected. In this example, the computing device 102 and the image capture device 104 are shown as being physically separate components, but it should be understood that the image capture device 104 can be integrated into the computing device 102 (e.g., a smartphone or tablet computer having an integrated camera). The image capture device 104 can be any suitable type of camera operable to acquire images or video and to convert the acquired images to image data.

The image capture device 104 may be controlled by the computing device 102 to acquire images or video. Particularly, for example, the computing device 102 may include an input/output module 106 configured to send instructions to the image capture device 104 and to receive image data from the image capture device 104. The I/O module 106 may send the received image data to an image analyzer 110. Further, the image analyzer 110 may store the image data in its local memory 108. Alternatively, the image data may be stored elsewhere such that it can be processed in accordance with embodiments of the present disclosure.

The image capture device 104 can be any suitable device operable to be controlled to capture images of in its field of view (FOW). In an example, the image capture device can capture a series of images at Times A, B, C, and D. The image capture device 104 may be instructed to capture these images as still image, or alternatively these images may be part of video captured by the imaged capture device 104. In this example at time A, the image capture device 104 can capture an image within a rectangle 112A. The extent of the FOW of the image capture device 104 when capturing this image is defined by the broken lines of the rectangle 112A. The capture of the image within rectangle 112A by the image capture device 104 is represented by a Time A. Subsequently, the image capture device 104 captures the image within rectangle 112B at Time B. The image capture device 104 subsequently captures the image within rectangle 112C at Time C. It is noted that this example presents 3 captured images for use by the systems and methods described herein; however, the systems and method disclosed herein may be suitably applied to any suitable number of captured images for predicting object location within images and for analyzing the images in the predicted location for object tracking according to embodiments of the present disclosure.

Continuing the aforementioned example of the capture of the images in rectangles 112A, 112B, and 112C, the image capture device 104 may generate image data representative of the captured images and send the image data to the computing device 102. The image data may be received by the I/O module 106 and subsequently sent to image analyzer 110 for storage in memory 108. The image analyzer 110 can be configured to analyze the image and determine a time sequence of the capture of the images represented by the image data. For example, the image analyzer 110 can identify time stamp information to recognize a time of image capture or at least an order in which the images of rectangles 112A, 112B, and 112C were captured. The image analyzer 110 can be configured to identify or recognize an object, and to determine its speed and/or direction of movement based on captured images. For example, the image analyzer 110 can recognize a ball 114 in the images of rectangles 112A, 112B, and 112C. Further, for example, the image analyzer 110 can determine a speed and/or direction of movement of the ball 114. The image analyzer 110 can recognize the object and determine its speed and/or direction based on any suitable techniques as known by those of skill in the image analysis arts.

The image analyzer 110 can be implemented by hardware, software, firmware, or combinations thereof. For example, functionalities of the image analyzer 110 described herein can be implemented by memory 108 and one or more processors 116. It is noted that the functionalities of the image analyzer 114 may be supported or enabled by other components not depicted.

In accordance with embodiments, the image analyzer 110 can determine a speed and/or direction of movement of an object of interest (e.g., the ball 114) based on one or both of the captured images (or image data) of rectangles 112A and 112B. For example, the image analyzer 110 can identify the ball 114 in the image(s) of rectangles 112A and 112B. The image analyzer 110 can determine positioning of the ball 114 within the frames of images to determine whether the ball has moved. In this example, the ball 114 has moved from the lower left in the first image (the image of rectangle 112A) to a position closer to the center in the second image (the image of rectangle 112B). Based on these determined positioned, the image analyzer 110 can determine that the ball 114 has moved and also a direction of movement from lower left to near center. Further, based on time stamp information or other information indicative of a time of capture of the images, the image analyzer 110 can estimate a speed of the ball 114 during the capture of the images. Therefore, based on identification of the ball 114 and determination of its positioning, the image analyzer 110 can determine a speed and/or direction of movement of the ball 114.

In another example, the image analyzer 110 can determine a speed and/or direction of movement of an object of interest based on a positioning of the object relative to one or more other objects or scenery in captured images. Returning to the example of images of rectangles 112A and 112B, a tree 118 may be positioned in the lower right of the captured images. The tree 118 is an object in the background of the scenery in this example. The image analyzer 110 may determine that it is a stationary object or part of the scenery. Further, the image analyzer 110 can determine that the ball 114 is moving with respect to the tree 118 and a direction of movement of the ball based on change in positioning with respect to tree 118. Further, the image analyzer 110 can estimate a speed of the ball 114 based on a time of capture of images and a distance change between the ball 114 and the tree 118 over the time as will be understood by those of skill in the image analysis arts.

The computing device 100 includes a user interface 120. The user interface 120 includes a display 122, which may be a touchscreen display for receipt of input by a user. For example, the user may interact with the display 122 for suitably controlling capture of images by the image capture device 104. Further, the display 122 may display the captured images or video.

FIG. 2 illustrates a flow diagram of a method for predicting object location within images and for analyzing the images in the predicted location for object tracking in accordance with embodiments of the present disclosure. It is noted that the method of FIG. 2 is described by example as being implemented by the system 100 shown in FIG. 1, but it should be understood that the method may alternatively be implemented by any other suitable system or computing device.

Referring to FIG. 2, the method includes receiving 200 one or more first images captured by an image capture device. For example, the image capture device 104 shown in FIG. 1 can capture images, such as the images of rectangles 112A and 112B.

The method of FIG. 2 includes determining 202 a speed and/or direction of movement of an object of interest based on the one or more images. Continuing the aforementioned example, the image analyzer 110 can receive the image data of the captured images and determine a speed and/or a direction of movement of the ball 114 based on the captured images. The image data can be stored in memory 108 and suitably analyzed for determining the speed and/or direction of the ball 114 when the images were captured.

The method of FIG. 2 includes receiving 204 one or more second images captured by the image capture device. Continuing the aforementioned example, the image capture device 104 can capture one or more other images subsequent to capturing the first image(s). For example, the image capture device 104 can capture the image of rectangle 112C. The image analyzer 110 can receive, from the image capture device 104, image data corresponding to the captured image of rectangle 112C. As shown in FIG. 1, rectangle 112C also includes the ball 114, and it is positioned in the upper right portion of the image.

The method of FIG. 2 includes predicting 206 an area of location of the object of interest within the one or more second images based on the determined speed and/or direction of movement of the object. Continuing the aforementioned example, the image analyzer 110 can predict an area of location of the ball 114 within the image of rectangle 112C based on the determined speed and/or direction of movement of the ball 114. As an example, the image analyzer 110 can determine that the ball 114 is moving in a direction towards the upper right portion of captured image and will be at that position when the image of rectangle 112C was captured based on the speed and/or direction of the ball 114. In this analysis, the image analyzer 110 can determine this by identifying positions of the ball 114 in the images of rectangles 112A and 112B and determine that the ball's 114 trajectory is towards the upper portion. The image analyzer 110 may subsequently identify the upper portion as being the predicted location of the ball 114 when the image of rectangle 112C was captured. This may similarly be applied to other captured images in view of a current direction and/or speed of an object in previously captured images. As a result of identifying a predicted portion of an image where an object of interest is likely located, the image analyzer 110 can efficiently only analyze that predicted portion of the image when conducting analysis associated with the object of interest. Such detailed analysis may not need to be applied to other areas of the image.

The method of FIG. 2 includes analyzing 208 the one or more second images in the predicted area of location for tracking the object of interest. Continuing the aforementioned example, the image analyzer 110 can search the predicted area for the ball 114, such as the upper right portion of the image of rectangle 112C. For example, the analysis can includes identifying the object and its location of the object.

Further, the method of FIG. 2 can include preventing 210 analysis of the one or more second images outside of the predicted areas of location. Continuing the aforementioned example, the image analyzer 110 can prevent analysis of the predicted area for the ball 114 to thereby efficiently only analyze areas where the ball 144 is predicted to be located in the images.

FIG. 3 illustrates diagram depicting a sequence of images captured of an object of interest over time for showing how the object's location at a later captured image is predicted in accordance with embodiments of the present disclosure. Referring to FIG. 3, the object of interest is a person indicated by references 300A, 300B, 300C, and 300D as captured in a sequence of images at Times A, B, C, and D, respectively. The person 300A, 300B, 300C, 300D is walking up a hill 302 during the time of capture of the images. For simplicity of illustration, it is noted that the FOV of the image capture device capturing each of the 4 images at Times A, B, C, and D stays the same. However, the techniques described herein may be similarly applied if the FOV changed. In such case, a stationary point of reference, such as the hill 302, may be used for during analysis to determine that the object of interest is moving as will be understood by those of skill in the image analysis arts.

With continuing reference to FIG. 3, the image analyzer (e.g., image analyzer 110) can receive the 4 captured image or the representative data for predicting location of the person within one or more later captured images such as the images captured at Times C and D in accordance with embodiments. The image analyzer can also analyze the images in the predicted locations at Times C and D in accordance with embodiments. The image captured at Time A is the first captured among the 4 images, and so forth with the image captured at Time D being the last captured among the 4 images.

For purpose of analysis and prediction of an area of location of an object, the image analyzer can divide the captured images into sections. In this example, an image is captured into 12 rectangular sections, although images can be divided into any suitable number and shaped sections for analysis and prediction of location of an object. The 12 sections of the images captured at Times A-D are labeled 1-12 in FIG. 3.

Initially, the image analyzer can identify the person 300A and 300B in the images captured at Times A and B, respectively, as an object of interest to track. The image analyzer can determine coordinate positions of the person 300A and 300B in the images captured at Times A and B, respectively. Further, the image analyzer can determine a movement of the person based on the changed in the coordinate position of the person between the Times A and B. Particularly, the image analyzer can determine that the person's net movement between the image captured at Time A and the image capture at Time B is to the right and slightly upward. The direction of the movement between Times A and B is represented by arrow 304A.

Based on the direction of movement between Times A and B, the image analyzer can predict that the person may move the same or similarly between Times B and C. For example, the image analyzer can predict that the person's speed and direction of movement will be the same or similar in the case of the rate of capture of the images (i.e., frame rate or image sampling rate) staying the same or at a similar rate. In this case, the image analyzer can predict that the person will be located entirely or partially within sections 7 or 11. In one example, the image analyzer can predict a consistent speed such that the person moves horizontally to the right to either section 7 or 11 at Time C. In another example, the image analyzer can predict that the vertical movement of the person stays about the same so that the person is at section 11 at Time C, or the person's movement along a vertical direction is about the same such that the person is within section 7 at Time C. In this instance, if analysis is to be performed on the image captured at Time C for example, the image analyzer can focus analysis of the image only at one or both of sections 7 and 11. In this example, the image analyzer may begin its analysis at section 11 and attempt to determine whether the person is in the predicted location at section 11 in the image captured at Time C. Upon not locating or identifying the person in section 11, the image analyzer may turn to the other predicted location of section 11 and determine whether the person is in the predicted location at section 7. Therefore, in this example, the image analyzer predicts 2 possible sections of location of the object and analyzes each in turn to find which one includes the object. As a result, the area of analysis is less than if the image analyzer searched the entirety or a larger area of the image for locating the person. Also, the analysis time and processing is reduced due to less area of the image needing analysis.

Continuing the example of FIG. 3, the image analyzer can predict the area of location of the person 300D in the image captured at Time D. To do so, the image analyzer can determine a direction of movement of the person based on two or more prior captured images. In this example, the image analyzer can analyze the 2 immediately prior images captured at Times B and C for predicting the direction of movement. Arrow 304B represents a direction of movement of the person between Times B and C. The image analyzer can determine this direction, and predict the same or similar direction between the images captured at Times C and D. Further, the image analyzer can predict the same or similar distance traveled in the case of the times of capture of the images is the same (e.g., consistent frame rate). In this example, the image analyzer can predict that the person 300D (captured in the image at Time D) will be in section 4. Therefore, upon predicting an area of location in section 4, the image analyzer can analyze the image captured at Time D in section 4. As a result and similar to the image analyzer's analysis of the image at Time C, the area of analysis of the image at Time D is less than if the image analyzer searched the entirety or a larger area of the image for locating the person. Also, similarly the analysis time and processing is reduced due to less area of the image needing analysis.

FIG. 4 illustrates a flow diagram of a method for predicting object location within images and for analyzing the images in the predicted location for object tracking in accordance with embodiments of the present disclosure. It is noted that the method of FIG. 4 is described by example as being implemented by the system 100 shown in FIG. 1, but it should be understood that the method may alternatively be implemented by any other suitable system or computing device.

Referring to FIG. 4, the method includes receiving 400 one or more first images captured by an image capture device in accordance with a first image sampling characteristic. For example, image analyzer 110 may receive one or more images captured by image capture device 104. The image sampling characteristic can be, for example, an image sampling rate or frame rate in the case of video. For example, the images may be captured at the standard 24 frames per second (fps) or another suitable frame rate. The image capture device 104 may communicate the image sampling rate to the image capture device in one example. In another example, the image capture device 104 may determine the image sampling rate based on time stamp or other information associated with the received images.

The method of FIG. 4 includes identifying 402 an object of interest among the first image(s). Continuing the aforementioned example, the image analyzer 110 can apply a suitable image analysis technique to identify an object (e.g., ball 114 in FIG. 1 or person 300A-300D in FIG. 3) in received images. Subsequently, the method includes determining 404 a speed and/or a direction of movement of the object of interest. For example, the image analyzer 110 can determine a speed and/or a direction of the ball 114 or person 300A-300D.

The method of FIG. 4 also includes instructing 406 the image capture device to capture one or more second images at a second image sampling characteristic that is different than the first image sampling characteristic based on the determined speed and/or direction of movement of the object of interest. Continuing the aforementioned example, the image analyzer 110 can determine a speed of the object based on captured images. The image analyzer 110 can determine to increase, decrease or maintain an image sampling rate based on the speed and instruct the image capture device 104 to capture any subsequent images or video at this increased, decreased or maintained image sampling rate. As an example, the image analyzer 110 can determine to increase the image sampling rate to a set rate in response to determining that the object is moving at above a predetermined speed, within a predetermined range of speed, or above a predetermined speed. For example, the image sample rate may be increased to 35 fps. In another example, the image analyzer 110 can determine to decrease the image sampling rate to a set rate (e.g., 15 fps) in response to determining that the object is moving at less than a predetermined speed, within a predetermined range of speed, or less a predetermined speed. Similarly, the image sampling rate can be changed based on a determined direction of the object. For example, if the object is not moving, then the image sampling rate may be decreased. The change to increase the image sampling rate may be effected because it may be deduced that the object is rapidly moving and thus images need to be captured at a higher rate in order to track it. Conversely, the change to decrease the image sampling rate may be effected because it may be deduced that the object is rapidly slowly or not at all and thus images may be captured at a lower rate in order to track it.

The method of FIG. 4 includes analyzing 408 the second image(s) for tracking the object of interest. Continuing the aforementioned example, the image analyzer 110 can perform analysis in the images such as identifying the object and its location.

FIG. 5 illustrates a flow diagram of a method for capturing images at a different image sampling rate based on color and/or structure of an object of interest as compared to other areas in images in accordance with embodiments of the present disclosure. It is noted that the method of FIG. 5 is described by example as being implemented by the system 100 shown in FIG. 1, but it should be understood that the method may alternatively be implemented by any other suitable system or computing device.

Referring to FIG. 5, the method includes receiving 500 images captured by an image capture device. For example, the image capture device 104 of FIG. 1 can capture images and send them to the image analyzer 110. For example, the image capture device 104 can capture the images of rectangles 112A-112C including the ball 114 and tree 118.

The method includes determining 502 a contrast in appearance of the object of interest to areas in the captured images. Continuing the aforementioned example, the image analyzer 110 can determine that there is a contrast in appearance of the ball 114 as compared to the tree 118 or other objects/portions in the captured images. Example contrasts can be contrasts of likeness of color, structure, or the like. For example, the ball 114 may be red and the tree may be green so that there is a contrast of color. Further, for example, the ball 114 has a structural difference of being round in shape, whereas the tree 118 may be considered triangular in shape. The image analyzer 110 can determine these contrasts of appearance.

The method includes instructing 504 the image capture device to capture other subsequent images at a different image sampling rate based on the contrast in appearance. Continuing the aforementioned example, the image analyzer 110 can instruct the image capture device 104 to capture subsequent images at the same, increased, or decreased rate based on the contrast in appearance. For example, if there is a high contrast, then the image sampling rate can be decreased. Conversely, if there is a low contrast, then the image sampling rate can be increased. For example, the colors red and green have a high contrast, and therefore it may be not require a high number of images to track a red object since it is easy to distinguish from surrounding objects that are green. However, if the ball is also green, then the image sample rate can be increased to acquire more images for making it easier to distinguish from surrounding objects. Similar for shape, if several objects are also round, then a high image sampling rate may be needed to distinguish the ball 114 from the nearby objects in the images.

The method can also include capturing 506 the subsequent images at the different image sampling rate. Continuing the aforementioned example, the image capture device 104 can capture images as instructed. For example, the image capture device 104 can increase, decrease or maintain its previous image sampling rate.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
capturing, by an image capture device, first images of a first object and a second object at a first predetermined image sampling rate;
determining a speed and/or a direction of movement of the first object based on one or more of the first images;
determining a contrast color and/or structure of the first object as compared to the second object in the first images;
capturing, by the image capture device, second images of the first object and the second object at a second predetermined image sampling rate different than the first predetermined image sampling rate based on the contrast color and/or structure of the first object as compared to the second object;
predicting an area of location of the first object within the second images captured at the second predetermined image sampling rate based on the determined speed and/or direction of movement of the first object; and
analyzing the second images in only the predicted area of location for tracking the object of interest.

2. The method of claim 1, wherein the second images are captured subsequent to the capture of the first images.

3. The method of claim 1, further comprising identifying the object of interest among the first images.

4. The method of claim 1, further comprising preventing analysis of the second images outside of the predicted area of location.

5. The method of claim 1, further comprising:

determining a contrast in appearance of the first object to areas in one or more of the first images; and instructing the image capture device to capture the second images at a different image sampling rate than the first predetermined image sampling rate based on the contrast in appearance.

6. The method of claim 5, wherein determining the contrast in appearance comprises determining a likeness of color and/or structure of the first object with colors and/or structure of the areas in the first images, and wherein instructing the image capture device comprises instructing the image capture device to capture the second images at the different image sampling rate based on the determined likeness of color and/or structure.

7. The method of claim 1, wherein the area of location is one of a plurality of areas in the second images, and wherein the method further comprises:

determining whether the object of interest is in the predicted area; and in response to determining that the object of interest is not located in the predicted area, determining whether the object of interest is located in another area among the plurality of areas that is adjacent to the predicted area; and in response to determining that the object of interest is located in the predicted area, implementing the step of analyzing the second images in the predicted area of location.

8. The method of claim 1, wherein the object of interest is a first object of interest, and wherein the method further comprises:

determining a speed and/or a direction of movement of a second object of interest based on the first images;

receiving one or more second images captured by an image capture device;

predicting an area of location of the second object of interest within the second images based on the determined speed and/or direction of movement of the second object; and analyzing the second images in the predicted area of location for tracking the second object of interest.

9. A method comprising:

capturing, by an image capture device, first images in accordance with a first image sampling characteristic;

identifying an object of interest among the first images;

determining a speed and/or a direction of movement of the object of interest in relation to one or more other objects among the first images;

determining a contrast color and/or structure of the object as compared to other the one or more other objects and areas in the first images;

capturing, by the image capture device, second images at a second image sampling characteristic that is different than the first image sampling characteristic based on the determined speed and/or direction of movement of the object of interest and the determined contrast of color and/or structure of the object as compared to the one or more other objects and other areas in the first images; and analyzing the one or more second images for tracking the object of interest.

10. The method of claim 9, wherein the first and second image sampling characteristic comprises an image sampling rate.

11. The method of claim 9, wherein the second images are captured subsequent to the capture of the first images.

12. The method of claim 9, wherein determining the contrast in appearance comprises determining a likeness of color and/or structure of the object of interest with colors and/or structure of the areas in the first images, and wherein instructing the image capture device comprises instructing the image capture device to capture the second images at the different image sampling rate based on the determined likeness of color and/or structure.

* * * * *